Dec. 29, 1925.  
N. W. NILSON  
FRICTION MATERIAL  
Filed Dec. 20, 1919  
1,567,858
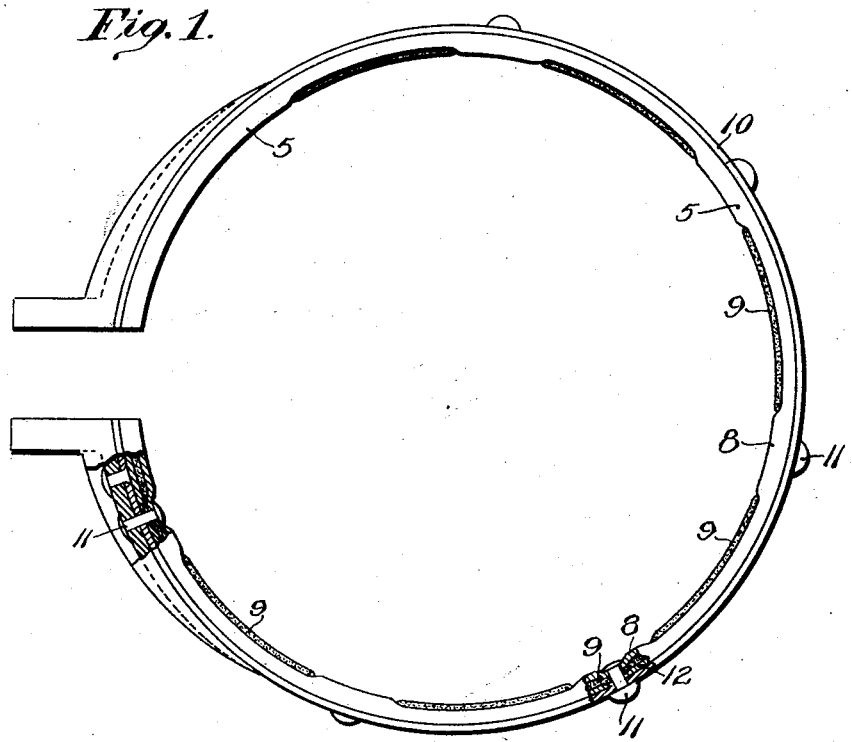
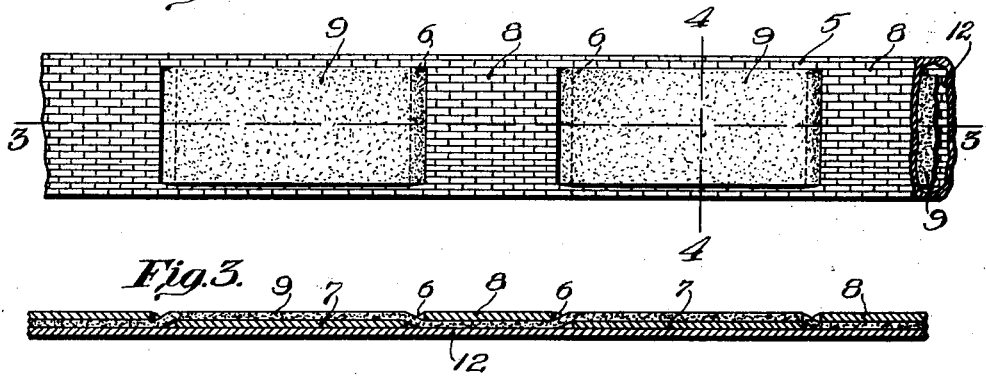
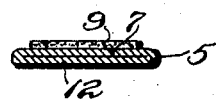
INVENTOR  
Nils William Nilson  
BY  
ATTORNEY Patented Dec. 29, 1925.

1,567,858

UNITED STATES PATENT OFFICE.

NILS WILLIAM NILSON, OF WALPOLE, MASSACHUSETTS, ASSIGNOR TO ADVANCE AUTOMOBILE ACCESSORIES CORP., OF CHICAGO, ILLINOIS, A CORPORATION OF DELAWARE.

FRICTION MATERIAL.

Application filed December 20, 1919. Serial No. 346,329.

*To all whom it may concern:*

Be it known that I, NILS WILLIAM NILSON, a citizen of the United States, residing at Walpole, in the county of Norfolk and Commonwealth of Massachusetts, have invented certain new and useful Improvements in Friction Materials, of which the following is a specification.

This invention relates to friction material and more particularly to such material designed for frictional engagement with a smooth cooperating surface, such, for example, as the linings of brake bands, friction producing members used between the cooperating surfaces of friction clutches, power transmission belts, and analogous purposes.

The object of the invention is to provide an efficient friction material of the character described, at a low cost and which will take hold of the cooperating surface in accordance with the pressure thereupon, without "chattering," that is, making a series of instantaneous grips, and which will hold to the cooperating surface with a firm non-slipping grip when sufficient pressure is exerted thereupon.

Another object is to provide a long wearing material which will not become ineffective when its original surface has been worn away.

The various features of the invention employed to the accomplishment of these objects and such others as may hereinafter appear, will best be understood from the following description taken in connection with the accompanying drawings of a brake lining embodying the invention, in which:—

Figure 1 is an elevation of a brake band having my improved lining attached, certain parts being shown in section;

Fig. 2 is a plan view of a portion of the lining;

Fig. 3 is a central longitudinal section of Fig. 2; and

Fig. 4 is a section on the line 4—4 of Fig. 2.

It is desirable that a friction material for the purposes described should have considerable tensile strength as well as frictional qualities. It has been customary to provide such a material comprising a fabric base with cork plugs extending therethrough or with a layer of cork attached to one surface. These constructions have been open to certain objections, however, such as the cork becoming loose from the fabric and chattering when the cooperating members were first thrown into engagement. I have overcome these difficulties by attaching the cork to the fabric in a more secure manner than has been done heretofore and by providing a yielding support or cushion for the cork which allows it to give slightly when first put under pressure. To this end I form a brake lining or similar article from a strip of fabric or other material of suitable tensile strength, having a series of transverse slits which stop short of the edges and threading or weaving a narrower strip of some flexible frictional material such as cork, alternately over and under successive portions of the fabric so as to present alternate rectangles of cork and fabric. The lining is attached to the brake band by suitable fasteners spaced so as to occur where the fabric is exposed to the cooperating member.

In order to secure greater strength and to provide a greater cushioning effect back of the exposed areas of cork, I prefer to provide the lining thus constructed with a backing of yielding material, preferably fabric, and I have discovered that the strength may be greatly increased by making this backing and the cork carrying fabric of a single integral piece. The method of making the preferred embodiment of the invention includes the steps of cutting circumferential slits of a length of not more than one half the circumference in a tube of textile material, flattening the tube, and threading or weaving a strip of flexible frictional material into the slits. The flexible material may be secured to the fabric by an adhesive and the fabric may be chemically treated if desired.

In the illustrated embodiment of the invention, the fabric 5 is in the form of a close woven tube which has been flattened and one side of the double walled strip thus formed is provided with a series of transverse slits 6 which may be made before or after the tube is flattened. The slits are shown spaced so as to form alternate long sections 7 and short sections 8 in the fabric in which case a cork strip 9 is passed over the long sections and under the short sections. As shown in Fig. 2 the wearing surface of the lining is composed mostly of cork which is backed up by two thicknesses of fabric, that is, the section 7 and the backing 12. When the lining is attached to a brake band 10 (Fig. 1) rivets 11 are inserted in the short sections 8 of the fabric and pass through the cork and the backing.

If desired the slits 6 may be equally spaced so as to present areas of equal length as viewed in Fig. 2. One advantage to be had from such an arrangement is that the lining may be worn down to the last layer of fabric or backing without changing the efficiency of the brake for the reason that when the first layer of cork and fabric has been worn away, the second layer having equal areas of cork will continue to wear. It is preferred that the slits 6 shall be made of a slight width, perhaps one eighth of an inch, so that no bunches will be formed where the cork passes through the fabric, as shown in Fig. 3.

The particular embodiment of the invention selected for illustration in Figure 1, is a transmission band for use in a Ford automobile where it is used in an oil bath. When so used, the compressible backing 12 is of particular advantage in that it absorbs oil from the bath when expanded and gives up this oil to lubricate the friction surfaces when the band is again tightened on the co-operating drum.

While one embodiment of the invention has been selected for the purpose of illustration, it is to be understood that the invention is not limited to the exact materials or arrangement of parts shown and described except in so far as is specified in the following claims.

What is claimed as new, is:—

1. A friction material comprising a fabric having a series of slits removed from the edges and a flexible frictional strip woven in and out of the slits.

2. A friction material comprising a fabric having a series of slits removed from the edges, a flexible frictional strip woven in and out of the slits and a cushioning member coextensive with the fabric.

3. A friction material comprising a fabric having a series of slits removed from the edge, a flexible frictional strip woven in and out of the slits and a backing integral with the fabric.

4. A friction material comprising a flat tube having a series of transverse slits in one side and a frictional strip passing alternately over and under the portions of the tube between the slits.

5. A brake lining comprising a flattened fabric tube having a series of transverse slits in one side and a cork strip woven in and out of the slits.

6. A friction material comprising two layers each comprising alternate areas of fabric and a non-slip material, the relation of the two layers being such that each fabric area is superimposed on an area of the non-slip material.

7. A friction material comprising a sheet having a series of openings and a strip passing alternately over and under the portions of the sheet between the openings.

8. A brake lining comprising two different materials, one being a strengthening material and the other a frictional material, woven together.

9. A brake lining having alternate sections of frictional material and strengthening material positioned to engage the brake and other sections of frictional material exposed to the brake after the lining has become worn.

10. A brake member comprising a self-sustaining body portion and an insert of frictional material set back from the original wearing surface of the body and adapted to be exposed by wear.

11. A duplex friction lining of the kind described having, in combination, a facing of wearing material to which is united a backing of compressible material, and a friction insert adjacent the backing material but carried by the wearing material and adapted to move against the backing material under pressure, substantially as described.

In testimony whereof I have hereunto affixed my signature.

NILS WILLIAM NILSON.